Patented July 9, 1946

2,403,671

UNITED STATES PATENT OFFICE 2,403,671

ISOMERIZATION OF OLEFINIC HYDROCARBONS

Maryan P. Matuszak, Bartlesville, Okla., assignor to Phillips Petroleum Company, a corporation of Delaware No Drawing. Application May 4, 1942,
Serial No. 441,705

9 Claims. (Cl. 260—683.2)

This invention relates to the isomerization of organic compounds, more particularly to isomerization by catalytic shifting of at least one double bond or olefinic linkage in an aliphatic radical having a chain of at least three carbon atoms, and more particularly to the isomerization of unsaturated hydrocarbons having one or more shiftable double bonds.

Although isomerization of unsaturated organic compounds by shifting of the double bond can be obtained to some extent by known means, such means generally either have given yields far from the equilibrium values or have caused accompanying changes more drastic than a simple shifting of the double bond. For example, a number of catalysts have been proposed for promoting the isomerization of the normal butenes to isobutylene, whereby the four carbon straight-chain structure of the normal butenes is destroyed. At times, such drastic changes in carbon-skeletal structure are undesired, as when it is desired for example to convert one of the normal butenes to another normal butene. Similarly, although noncatalytic isomerization of the normal butenes without conversion to isobutylene is known, it seems to start at such a high temperature, between 600 and 650° C., that it is accompanied by extensive decomposition to lower-boiling products (Hurd and Goldsby, J. Am. Chem. Soc., 56, 1813 (1934)).

It is an object of this invention to effect isomerization of an unsaturated organic compound without change in the carbon skeleton thereof.

Another object of this invention is to provide effective catalysts for such isomerization.

Another object of this invention is to isomerize an unsaturated hydrocarbon having at least one double bond and having at least four carbon atoms linked together in a chain, by a simple shift of the double bond.

A specific object of the invention is to convert butene-1 into butene-2.

Another specific object is to convert butene-2 into butene-1.

Another specific object is to convert nonconjugated diolefins into the corresponding conjugated diolefins.

Other objects and advantages of the invention will be apparent from the following description and/or the appended claims.

The present invention is partly based upon my discovery that certain hereinafter-described catalysts suitable for the dehydrogenation of hydrocarbons, as of paraffins to olefins, or of olefins to diolefins, or the like, possess the ability to isomerize olefins, diolefins, and other unsaturated organic compounds by simple shifting of double bonds at temperatures below the temperature ranges in which these catalysts are used to effect said dehydrogenation. Linked with this discovery is the discovery that with this use of a relatively low isomerization temperature, the isomerization occurs without significant change in the carbon skeleton of the organic compound. Isomerization of unsaturated organic compounds in accordance with the present invention, is accomplished by catalysts comprising "black" chromium oxide. The black chromium oxide appears black to the eye when viewed en masse or in the form of granules. When finely divided, as in the form of a fine powder, it may appear black to dark green, the green being much darker than the bright green that is characteristic of chromic oxide, or chromium sesquioxide. This black chromium oxide appears to vary somewhat in composition, but appears to approach or average the composition of $CrO_2$, so that some justification may be said to exist for calling it chromium dioxide. This catalytic material should be distinguished from catalysts containing no black chromium oxide, or chromium dioxide, and comprising green or true chromic oxide, $Cr_2O_3$. Catalysts comprising black chromium oxide in accordance with the present invention possess the ability to shift the double bond in a temperature range in which the rate of isomerization is fast enough to be practical without producing carbon-skeletal changes, dehydrogenation, decomposition, or polymerization, and, therefore, they have an advantageous selectivity for isomerization by simple shifting of the double bond.

The isomerization is best conducted at a temperature below the temperature range in which the catalyst produces extensive dehydrogenation of paraffins such as isobutane or normal butane. This dehydrogenation temperature range is usually above about 400° C., which may be taken as the approximate upper limit of the temperature range for the isomerization of olefins, the most stable of the unsaturated organic compounds which may be isomerized by means of the present invention. In this connection, it may be mentioned that the temperature range for the catalytic dehydrogenation of olefins to the corresponding diolefins generally is about 100° C. above the temperature range for the dehydrogenation of the corresponding paraffins to the olefins; so that, in so far as any particular olefin is concerned, the temperature range for its isomerization in accordance with this invention is generally separated from the temperature range for its dehydrogenation by about 100° C. Because of this fact, complications from dehydrogenation of the olefin to be isomerized are substantially avoided. On occasion, a slight amount of incidental dehydrogenation may be tolerable, and the temperature then permissibly may be so chosen, if desired, as to be in the temperature interval between the usual isomerization range and the usual dehydrogenation range. Generally, however, temperatures above about 450° C. should be avoided, as the optimum isomerization temperature is usually at least 100° C. below this value.

The lower limit of the temperature range for isomerization depends upon the particular composition of the catalyst, and upon the organic compound being isomerized. For especially active catalyst compositions and for relatively easily isomerized compounds, it may be as low as room temperature. However, for most catalyst compositions comprising black chromium oxide, the lower temperature limit for isomerization is usually about 100° C. The optimum temperature is usually in the range of about 150 to 350° C., but in particular instances it may be somewhat above or below this range. The exact optimum temperature range for isomerization of any particular organic compound with the catalysts of this invention may be readily found by trial.

So far as is known at present, all catalysts comprising black chromium oxide that are useful in the art of catalytic dehydrogenation of hydrocarbons are suitable for use in the present isomerization process. Many modes of preparation of such catalysts have been shown in different publications, as for example in U. S. Patents 1,905,383, 2,098,959, 2,270,887, 2,274,988, and many others, and for the sake of simplicity need not be repeated herein in detail. For the same reason, many improved modes of catalyst preparation that have been described need not be repeated here, especially since the present invention does not depend upon any particular method of preparation. In general, however, the preparation of such catalysts involves the nonspontaneous thermal decomposition of one or more chromium compounds, such as: chromic salts, preferably of monobasic acids, hydrous chromium oxides and/or hydroxides, and various chromates or polychromates of volatile nitrogen bases, preferably ammonia; also double or mixed chromates such as may be represented by the general formula $(NH_4)_2M(CrO_4)_2$, in which M is a divalent metal, particularly such as cadmium, chromium, or copper.

Many nonchromium compounds may also be present in these catalysts, to impart to the catalysts desirable properties or characteristics. Among such are the difficultly reducible metal oxides such as for example, alumina, thoria, urania, magnesia, zirconia, silica, beryllia, vanadia, titania, zinc oxide, and others. Of these oxides, those of the tetravalent metals that can exist as gels, such as those of uranium, vanadium, and the metals of the left-hand column of group IV, especially thorium, titanium, and zirconium, are exceptionally advantageous. One or more of these oxides may be incorporated in the catalyst in any desired proportions. Usually equimolecular proportions are fully satisfactory. A preferred manner of incorporation is by coprecipitation of mixed gels containing chromium oxide and the other metal oxide, especially with ammonium hydroxide as the precipitating agent. An alternative manner is intimate mixing of the highly hydrous oxides, preferably soon after formation by precipitation, as from dilute aqueous solution, for example in the manner described in U. S. Patent 2,098,959.

The catalysts may be in any form desired, such as powder, pellets, or granules. Especially suitable are gel-type granules, and crystallomorphous granules such as those obtained by nonspontaneous thermal decomposition of a crystalline salt of chromic acid and a volatile nitrogen base such as ammonia, without disruption of the original crystals. They may or may not comprise catalytically inferior or inert carriers or supports. Usually a granular form of catalyst, such as 4 to 40 mesh, is preferred, especially for vapor-phase isomerization. Usually also, a neutral or slightly alkaline composition is to be preferred to an acidic composition, as traces of acids appear to promote carbon-skeletal changes. For this reason, it is sometimes advantageous to incorporate in the catalyst a nonvolatile alkalizing compound, as by treating the dried catalytic granules with a dilute solution, of a strength usually below about 5 per cent by weight, of an alkali-metal or alkaline-earth hydroxide, carbonate, or other salt, preferably of a volatile acid or of a metallate-forming acid such as aluminic, boric, chromic, molybdic, tungstic, or the like. However, overalkalizing should be avoided, as it decreases the catalytic activity.

Black chromium oxide in any proportions acts as an effective isomerization catalysts in accordance with this invention. However, it is generally preferred that the catalyst composition contain at least about 5 weight per cent, and it may contain on up to 100 per cent, of black chromium oxide.

Many modes of contacting the organic compound to be isomerized with the catalyst may be practiced within the scope of this invention, including those in which the contact material is fixed in position, which is usually preferable because of its simplicity, and those in which it is moved with or against the liquid and/or vapor. The contacting may be batchwise, but in commercial practice it is preferably continuous. Liquid-phase isomerization is frequently advantageous, providing not only excellent contacting of the reactant with the catalyst but also aiding in maintenance of catalytic activity by washing away incidental traces of high-boiling materials that otherwise might occlude catalytic spots. Obviously, the properties of the organic compound must be considered, at least to some extent, for it is impossible to have liquid-phase contacting at temperatures above the critical temperature of the compound. Similarly, the properties of the catalyst, such as its particle size and its catalytic activity, have some influence upon the choice of operating conditions. The pressure in liquid-phase contacting must be sufficient to maintain the liquid phase. In vapor-phase contacting, the pressure may vary widely, within vapor-pressure limitations, from highly superatmospheric pressures to highly subatmospheric pressures, though usually a pressure between about 1 and 5 atmospheres is preferred as being most easily obtainable.

Suitable times of contact of the isomerization mixture with the catalyst depend upon the particular catalyst composition, the temperature, and the particular compound or compounds involved. In vapor-phase isomerization, the time of contact may vary also with the pressure. It may vary from a fraction of a second in some instances to many minutes or even an hour or more in others. These interrelationships of catalyst, temperature, compound, and contact time, will be well understood by those skilled in the art.

The organic compound to be isomerized may be treated undiluted, but dilution is sometimes advantageous, especially for isomerization of high-boiling compounds in the vapor phase. Dilution may be effected if desired with an inert or carrier gas, such as nitrogen, methane, or the like. Usually a little free molecular hydrogen admixed with the compound being isomerized is advantageous, though preferably it should not exceed about 1 or 2 mol per cent in order to avoid undesired extensive hydrogenation. Such added gases may be subsequently removed from the product by known means, as by condensation of the product and separation of the gas. Pretreatment of the catalyst with hydrogen at an elevated temperature, such as a temperature of about 250° C. or higher, or even within the dehydrogenation range, is also beneficial. The mechanism producing the beneficial effect of hydrogen is not completely understood, but it probably involves conditioning of the catalyst by adsorption of the hydrogen. It will be understood that the present process is not a process for hydrogenation of unsaturated compounds, and that, if desired, hydrogen may be omitted, especially when the catalyst has been pretreated with this gas immediately before being used for the isomerization.

A mode of contacting that is advantageous in conducting many isomerizations of the type to which this invention is applicable comprises the use of a fractional-distillation column in which the column packing comprises an isomerization catalyst. In one manner of operating, the higher-boiling isomer is passed as a liquid to the kettle or to a point in the lower section of the column. This liquid is heated and vaporized, and the vapor becomes isomerized, in its upward passage through the catalytic packing, to the lower-boiling isomer. Thus the packing simultaneously acts to effect isomerization of liquids and vapors contacting it, and promotes rectification in the known manner of column packings by offering effective surface for liquid-vapor contact. The resulting isomerized material is generally a mixture of both isomers approaching closely in composition the equilibrium mixture at the temperature in the upper part of the catalytic packing. This mixture may be withdrawn as such and may be separated into the two isomers in any desired manner, as in a fractional-distillation column that is not packed with the isomerization catalyst, and the higher-boiling isomer may be returned to the feed stream to the catalyst-packed column. Instead of being so separated in another column, the mixture may be advantageously separated in an auxiliary upper section of the isomerizing column that is packed with some inert or nonisomerizing packing or that is provided with bubble-trays or plates or similar fractionating devices, such as are well-known in the art of fractional distillation, whereby the lower-boiling isomer may be withdrawn from the top of the column substantially pure, and the higher-boiling isomer is returned through refluxing to the catalyst-packed section of the column. In this way, for example, 2-olefins, such as butene-2, pentene-2, hexene-2, and the like, may be isomerized substantially quantitatively to the corresponding 1-olefins.

In another way of practicing such contacting, the column is operated in reverse, that is, the lower-boiling isomer is fed into the top of the catalyst-packed column. By contact with the catalyst it becomes partly isomerized, and the resulting mixture, which is partly in the liquid condition, flows downward through the catalyst packing and eventually reaches the end of the catalyst-packed section as a mixture of approximately the equilibrium composition for the temperature at that point. This mixture may be withdrawn and may be separated into the two isomers by suitable means such as in a fractional-distillation column that is not packed with the isomerization catalyst, and the lower-boiling isomer may be returned to the feed stream to the catalyst-packed column. Instead of being so separated in another column, the mixture may be advantageously separated in an auxiliary lower section of the isomerizing column that is packed with nonisomerizing packing or that has other fractionating devices performing the function of fractionating plates, whereby the higher-boiling isomer works its way downward and is eventually withdrawn in substantially pure form from the bottom of the column, whereas the lower-boiling isomer passes upwardly to the catalyst-packed section of the column. In this way, for example, 1-olefins, such as butene-1, pentene-1, hexene-1, and the like, may be isomerized substantially quantitatively to the corresponding 2-olefins.

As is well known, the number of possible isomers of an organic compound increases with increase in the number of carbon atoms it contains. Hence isomerization of some compounds in accordance with this invention may be used, with the aid of certain modifications, to produce isomers of boiling points intermediate those of the lowest-boiling isomer and the highest-boiling isomer. Thus, in the isomerization of compounds of a sufficient number of carbon atoms per molecule to permit the existence of more than two isomers, as for example in the case of the normal or unbranched hexenes, part or all of the isomerization mixture at one or more points along the isomerizing column may be withdrawn and separated, as by fractional distillation, to yield the intermediate-boiling isomer, such as hexene-3, as a product of the process. Any of the other isomers may then be returned to the isomerizing column for conversion into whichever isomer or isomers are desired. Suitable modifications of this character are believed to be within the ability of those skilled in the art, in the light of the teachings of the present disclosure.

In these various ways of contacting in catalyst-packed columns, a temperature gradient exists along the column, the bottom being at a higher temperature than the top. This gradient is established as in conventional fractional distillation, as by influx or application of heat at the bottom of the column and/or by withdrawal of heat at the top by means well-known in the art of fractional distillation. Pressure maintained in the column will be dependent on the vapor pressure of the organic compounds at the temperatures involved. Although this method of operating may appear to be superficially similar to conventional distillation in packed columns, the use of a contact material simultaneously as column packing and as isomerization catalyst is believed to be broadly novel for effecting isomerization and separation of resulting isomers of any compounds isomerizable by contact with isomerization catalysts at temperatures below the critical temperature of the compounds involved. The selection of a suitable isomerization catalyst for use as column packing is believed to be within the ability of those skilled in the art of isomerizing organic compounds, when the teachings herein are considered together with the known properties, especially the vapor pressure at various temperatures and the critical temperatures of the isomers involved.

The following examples are limited, for the sake of simplicity and to facilitate comparisons, to isomerization of the normal butenes, and illustrate the general principles of my invention. Other unsaturated compounds as described herein may be isomerized under similar conditions.

*Example I*

Butene-1 at atmospheric pressure was passed through a bed of 20 to 40 mesh chromium oxide gel that had been previously treated with nitrogen-diluted hydrogen while the temperature was slowly increased from about room temperature to about 500° C. and that had been cooled at 250° C. while in pure hydrogen. A different portion of the same catalyst, when tested for the dehydrogenation of isobutane at atmospheric pressure and at a space velocity of 2000 volumes per volume per hour, had shown itself to be of at least medium dehydrogenation activity by converting 17 per cent of the isobutane to isobutylene for a period of 18 hours in the temperature range of 451 to 550° C. During the present isomerization run, the catalyst temperature was 249 to 262° C., and the space velocity was varied in steps as shown in the following tabulation. This tabulation gives the content of butene-2 in the effluent as determined by a method similar to the dew-pressure method of Hachmuth (Ind. Eng. Chem., 24, 82 (1932)), as modified by Savelli et al. (Ind. Eng. Chem., anal. ed., 13, 873 (1941)), for analysis of two-component mixtures.

| Sample | Time, min. | Space velocity, vol./vol./hr. | Percent butene-2 |
|---|---|---|---|
| 1 | (Butene-1 feed) | | 0.0 |
| 2 | 105 | 100 | 83.8 |
| 3 | 150 | 200 | 82.2 |
| 4 | 190 | 400 | 78.0 |

At the lowest space velocity this catalyst effected practically equilibrium conversion of the butene-1 to butene-2, and at higher space velocities it continued to effect excellent conversion. No isobutylene was formed, and no dehydrogenation occurred. The catalyst was not revivified between samples and was still very active when the run was stopped.

*Example II*

After the run of Example I, the catalyst was revivified at 250° C. with 10 per cent oxygen in nitrogen; a temperature rise of 70° C. was observed, caused by combustion of adsorbed material. This revivification was followed by treatment with hydrogen at 250° C., and the catalyst was then used at 262° C. for isomerizing butene-1, which was passed at atmospheric pressure through the catalyst bed at a space velocity of 1000 volumes per volume per hour. A sample of the effluent taken 15 minutes after the start of the run had a butene-2 content of 80.0 per cent, showing that the catalyst effected excellent isomerization after revivification, even at a relatively high space velocity. At lower space velocities, the conversion to butene-2 approached or reached equilibrium conversion at the temperature of the catalyst bed.

*Example III*

Butene-2, passed over a catalyst comprising black chromium oxide, at about atmospheric pressure, at temperatures in the range of about 200 to 350° C., and at space velocities of about 50 to 1000 volumes per volume of catalyst per hour, is isomerized partly to butene-1, the extent of isomerization being substantially that corresponding to the equilibrium mixture at the reaction temperature, giving an effluent containing from about 10 to 20 per cent butene-1, depending upon the temperature.

Although this invention in its broadest aspects is applicable to many unsaturated organic compounds in general, it has been found most useful for the isomerization of unsaturated hydrocarbons, which present few or no complications such as those presented by constituent elements, such as halogens, sulfur, oxygen, and the like that may in specific instances cause formation of troublesome amounts of catalyst poisons or undesired by-products. Because of this fact, and in the interest of simplicity, the discussion herein is devoted primarily to the isomerization of unsaturated hydrocarbons, a few of which, namely certain simple olefins, have been already mentioned specifically. Many other and less-simple olefins and unsaturated hydrocarbons with more than one double bond may also be isomerized in accordance with this invention. The following two generalizations, which are based on extensive experimental work, may be used as guiding principles for any particular application to such less-simple unsaturated hydrocarbons.

First, at most isomerization temperatures, as herein given, the tendency for shifting of a double bond from a terminal position inwardly along the carbon chain is greater than the reverse tendency. That is, the position of the double bond may be said to decrease in stability the closer it is to an end of the carbon chain. In line with this principle, 1,5-hexadiene is readily isomerized by the process of this invention to 2,4-hexadiene; in this isomerization, 1,4-hexadiene and 1,3-hexadiene are usually formed as intermediate or by-product isomers, and if desired can be isolated. Similarly, allylbenzene is very readily isomerized to propenylbenzene in accordance with this invention, as in a fractional-distillation column packed with a catalyst comprising black chromium oxide and operated in the afore-described reverse way. Allyl toluene and various other allyl compounds are likewise isomerizable to propenyl compounds.

Second, the shifting of a double bond inwardly along the carbon chain is greatly facilitated if the inward double-bond carbon is unattached to hydrogen, that is, if it is carrying a side chain. In line with this principle, 2,5-dimethyl-1,5-hexadiene is isomerized to 2,5-dimethyl-2,4-hexadiene by the process of this invention with greater ease than is 1,5-hexadiene to 2,4-hexadiene, and 2-methyl-1,5-hexadiene is isomerized to 2-methyl-2,4-hexadiene with intermediate ease. More concretely, the ease of isomerization of these three initial diolefins may be said to be approximately as follows, 1,5-hexadiene:2-methyl-1,5-hexadiene:2,5 - dimethyl - 1,5 - hexadiene=1:10:20. Similarly, isopentene (2-methyl-1-butene) is readily isomerized to trimethylethylene, apparently somewhat more easily than is isopropylethylene to trimethylethylene, indicating that the tendency to shift past a carbon devoid of hydrogen is greater than the tendency to shift inwardly along the chain; however, either or both initial olefins can be used for the production of trimethylethylene in accordance with the present invention. Similarly still, 2-methyl-1-pentene and 2-methyl-1-heptene are very readily isomerized to 2-methyl-2-pentene and 2-methyl-2-heptene, respectively.

These foregoing two generalizations should not be construed as indicating that the isomerization goes in one direction only, for the isomerization is reversible, and the equilibrium mixture at any particular temperature can be obtained from either isomer. Thus, decrease in temperature shifts the equilibrium in favor of one isomer, such as, for example, butane-2, while increase in temperature shifts the equilibrium in favor of the other isomer, such as, for example, butene-1. The generalizations are helpful, however, as indicating roughly the probable proportions in which the isomers exist in the equilibrium mixture, as will be understood by those skilled in the art.

Another generalization of the same type indicates that there is a considerable tendency for the double bond to shift into a side chain if this side chain is a methyl group centrally located in the molecule. Thus, there is a considerable tendency for the 3-methyl-2-pentene to isomerize to 2-ethyl-1-butene. The opposite isomerization, of course, also occurs to a greater or less extent, depending upon the temperatures involved. Isomerization of this particular type is especially well promoted by catalysts that comprise thoria in addition to black chromium oxide. Because of this effect, which manifests itself as an acceleration or promotion of attainment of the equilibria of the isomerizations to which this invention is applicable, thoria is a preferred ingredient of the catalysts. Although widely varying proportions of thoria and black chromium oxide may be used, catalysts containing equal molecular proportions seem to be exceptionally suitable, especially when prepared by coprecipitation and dried to give a gel-type catalyst. Urania also is exceptionally advantageous in admixture with black chromium oxide, sometimes appearing to be even more so than thoria.

It may be observed that a number of the exemplifying isomerizations mentioned in the foregoing discussion relate to the production of conjugated diolefins from nonconjugated diolefins. Additional examples of this type are the following: 3-methyl-1,5-hexadiene to 4-methyl-1,3-hexadiene; 1,5-heptadiene to 2,4-heptadiene; 3-methyl-1,5-heptadiene to 5-methyl-2,4-heptadiene; and 2,6-octadiene to 3,5-octadiene. Still other applications will be obvious to those skilled in the art.

These isomerizations are substantially free from carbon-skeletal changes, unless the temperature is excessively high. Decreasing the temperature and compensatingly decreasing the space velocity may be resorted to if a tendency to carbon-skeletal changes manifests itself. However, in isomerization of olefins with catalysts consisting of black chromium oxide, experimental investigation has shown that such tendency appears to be absent even at temperatures well within the dehydrogenation range, such as 500° C.

The use of catalysts comprising black chromium oxide in accordance with this invention involves treatment of organic compounds to promote the shifting of one or more olefinic or double bonds or linkages contained in an unsaturated aliphatic radical having a carbon chain of at least three carbon atoms. In further explanation, it may be stated that the organic compound itself may not necessarily be entirely aliphatic, but that in general the double bond to be shifted is contained in the aliphatic portion thereof. The aliphatic radical may be a part of a carbon chain of four or more carbon atoms that may include a portion of a cyclic nucleus. For example, in allyl benzene, the carbon atom in the benzene ring to which the allyl group is attached may be considered to be a part of a chain containing at least four carbon atoms.

Since the invention may be practiced otherwise than as specifically described, and since many variations and modifications of it will be obvious to those skilled in the art, this invention should not be restricted otherwise than as specified in the appended claims.

I claim:

1. A process for effecting catalytic shifting of an olefinic linkage in an unsaturated hydrocarbon containing said olefinic linkage in an aliphatic radical having a chain of at least three carbon atoms without changing the carbon skeleton thereof which comprises introducing said hydrocarbon into a fractional distillation column, at least a portion of said column being packed with a solid granular isomerization catalyst comprising black chromium oxide having an average composition corresponding to the empirical formula $CrO_2$, said catalyst being so constituted and arranged as to effect said shifting of said olefinic linkage simultaneously with liquid-vapor contacting and consequent separation of the isomers by rectification, and carrying out simultaneous fractional distillation and said shifting of said olefinic linkage in said column while maintaining such conditions of temperature and pressure that said shifting of said olefinic linkage and said separation take place.

2. A process for effecting catalytic shifting of an olefinic linkage in an unsaturated hydrocarbon containing said olefinic linkage in an aliphatic radical having a chain of at least three carbon atoms without changing the carbon skeleton thereof, which comprises intimately contacting said hydrocarbon with a catalyst containing as its active isomerizing constituent black chromium oxide having an average composition corresponding to the empirical formula $CrO_2$, at a temperature in the range of about 150 to 350° C., for a period of time sufficient to effect shifting of said olefinic linkage to a substantial extent.

3. A process according to claim 2 in which the hydrocarbon is butene-1 and is thereby converted to butene-2.

4. A process according to claim 2 in which the hydrocarbon is butene-2 and is thereby converted to butene-1.

5. A process according to claim 2 in which the hydrocarbon is an aliphatic non-conjugated diolefin having at least four carbon atoms and is thereby converted to the corresponding diolefin.

6. A process according to claim 2 in which said black chromium oxide is prepared by non-spontaneous thermal decomposition of a crystalline salt of chromic acid and a volatile nitrogen base without disruption of the original crystals.

7. A process according to claim 2 in which the catalyst is a black chromium oxide gel having an average composition corresponding to the empirical formula $CrO_2$.

8. A process according to claim 2 in which the catalyst also comprises zirconia associated therewith.

9. A process according to claim 2 in which the catalyst comprises as the active isomerizing constituent thereof from 5 to 100 per cent of black chromium oxide having an average composition corresponding to the empirical formula $CrO_2$.

MARYAN P. MATUSZAK.